March 31, 1942. C. B. FRANCIS ET AL 2,277,663
RECLAMATION OF THE FINE DUST FROM BLAST FURNACES USING MANGANESE ORES
Original Filed Jan. 3, 1939
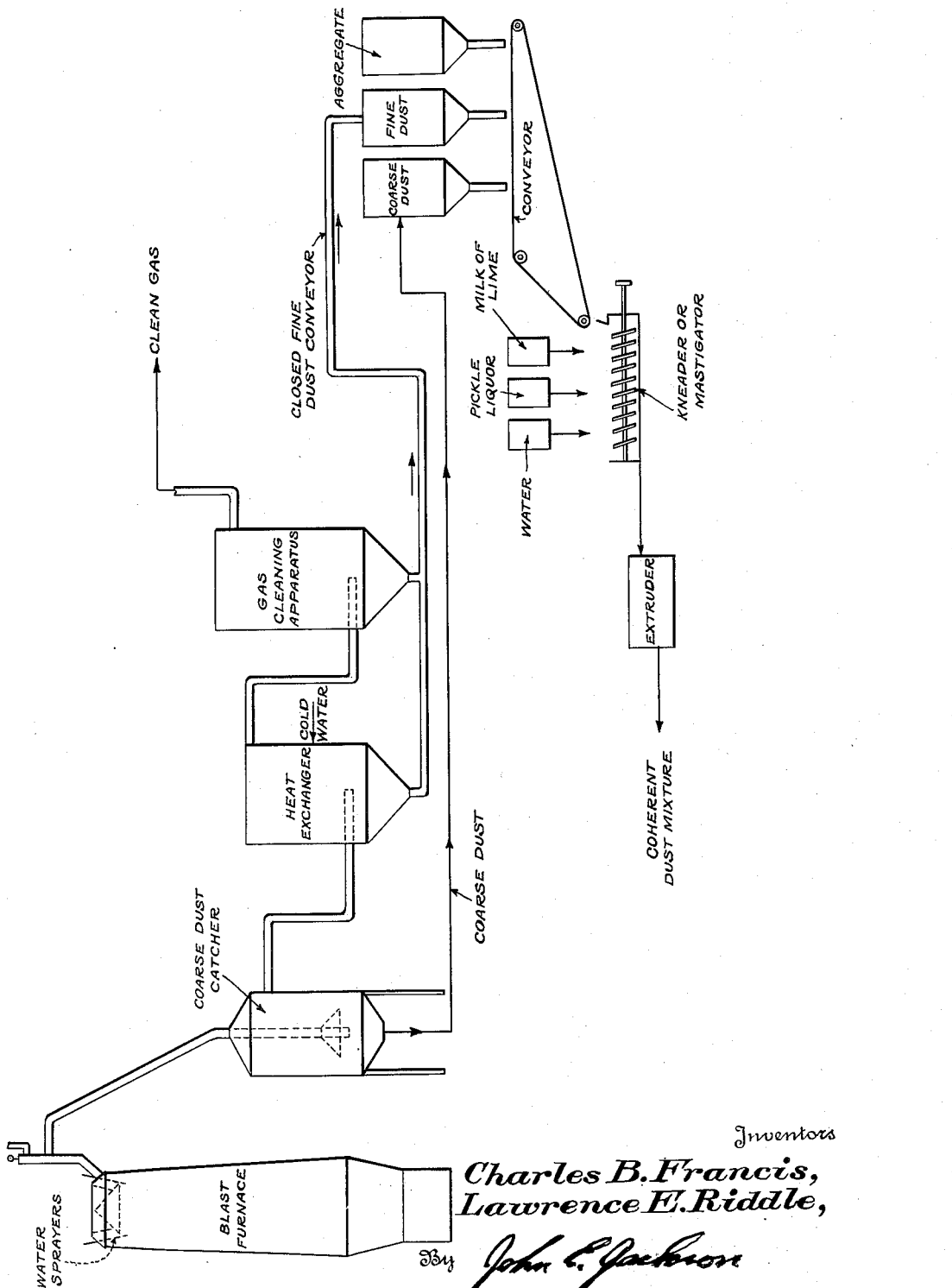
Inventors
Charles B. Francis,
Lawrence E. Riddle,
By John C. Jackson
Attorney Patented Mar. 31, 1942

2,277,663

UNITED STATES PATENT OFFICE 2,277,663

RECLAMATION OF THE FINE DUST FROM BLAST FURNACES USING MANGANESE ORES

Charles B. Francis, Pittsburgh, and Lawrence E. Riddle, Duquesne, Pa.

Continuation of application Serial No. 249,156, January 3, 1939. This application September 18, 1940, Serial No. 357,320

25 Claims. (Cl. 75—25)

Our invention relates to the manufacture of ferro-manganese and other iron-manganese alloys used in the manufacture of iron and steel, and has for its chief object the separation and reclamation of the dust from the gases ejected by blast furnaces making manganese products, through the use of other waste products obtained in the manufacture of iron and steel.

The complete process of our invention is carried out in two steps; namely, the separation of the fine dust from the blast furnace gas and the treatment of the dust to put it in condition for recharging into either a blast furnace or a steel making furnace.

As is well known, the ordinary grades of ferro-manganese, as well as spiegeleisen and other alloys containing lower precentages of manganese, represent a class of blast furnace products. In their production, manganese ore, which is largely imported into the United States, is charged by the usual methods through the top of a blast furnace with suitable proportions of coke to serve as fuel and a reducing agent, and of limestone to act as a flux to slag off the impurities and gangue of the ore.

The conditions of operation and reduction in the case of manganese ore, however, are quite different from those of iron ore. For example, complete reduction of the manganese ore is not effected in the blast furnace, and the complete reduction of the portion reduced is effected only at high temperatures by direct action of carbon on the partly reduced manganese oxide, near to or below the bosh of the furnace. Here the gas temperature is near to or slightly above the temperature at which the element manganese is volatilized, so that some of the manganese in vapor phase tends to flow with the gases toward the top of the furnace. Before the top is reached, this manganese in the vapor phase takes on oxygen, probably from the carbon dioxide formed through decomposition of the limestone and by reaction of carbon monoxide with the higher oxides of manganese. In addition, some of the sulphur charged into the furnace as sulphates is reduced to sulphides or hydrogen sulphide, and these with cyanides formed by reaction of the nitrogen of the air with the carbon of the coke, are carried towards and partly beyond the top of the furnace, instead of becoming fixed and subsequently decomposed as in the iron blast furnace.

As a result of these conditions, the dust carried by the gas stream through the outlets at the top of a furnace smelting manganese ores, differs widely from the dust carried from an iron smelting furnace, physically as well as chemically. Thus, in addition to the small particles of coke and of undecomposed ore and limestone, which comprise practically all of the dust blown from the iron blast furnace, a large portion of the solids in the hot gas stream from a furnace making manganese products is found as fume composed of sublimates and finely divided solids, the sublimates condensing to the solid phase as the gas cools.

The coarsest of the dust from a furnace producing iron-manganese alloys is collected in a dust catcher of the usual type, and some of the finer particles may be separated by dry dust separators of known design. The remainder is so finely divided that 80 to 95 per cent, depending upon the efficiency of the dry cleaners, will pass a No. 325 sieve, and the particle size of a goodly portion is measurable in microns, a small portion having a particle size smaller than 1 micron. Complete separation of this extremely fine dust and its preparation to a physical form suitable for recharging into the furnace present a problem which we have been able to solve only after many experiments conducted over a period of years.

The furnace gases cannot be cleaned of this finely divided dust by ordinary methods of wet washing, because a portion of it has setting properties similar to those of Portland cement; and the dust will clog any type of wet gas washer in a short time. The fine dust, as obtained in gas direct from the furnace, also has the property of adhering firmly to surfaces of steel, glass and fabric, except silk, so that it clogs filters close enough to block its passage, very quickly. The dust has a low specific gravity, and this fact, combined with the extremely small particle size, makes dry cleaners of all types ineffective in removing the dust from the hot gases as they are delivered from the furnace.

We have found, however, that practically all the dust can be separated from the gas by the known method of electrical precipitation, for instance, by pretreating the gas to effect certain chemical changes in the composition of its dust particles which modify their physical properties, particularly those affecting the nature and the intensity of the static electrical charge each particle carries or that may be developed on each particle.

The principles of the complete process of our invention, which is based upon the discoveries we have made through a close study of the chemical composition and physical characteristics of the dust particles, are explained as follows.

In the case of furnaces making ferromanganese, for instance, the top temperatures are 400° F. to 500° F. higher than the top temperatures of iron blast furnaces, and it is customary to use water sprays to cool the materials at this point to protect the bells and valves, which are made of metal. As the dust-ladened gases leave the furnace outlets, the temperature is falling continuously, and as the temperature is lowered to 212° F. or lower, which normally happens, the dust and fume particles undergo both physical and chemical changes. The sublimates, for example, condense to solids, and the solid particles absorb carbon dioxide and water vapor from the mixture of fixed gases. At the high temperatures just within the top of the furnace, the composition of the fine dust as shown by the usual chemical analysis is as follows:

Bases

| | Per cent |
|---|---|
| Manganese oxide, MnO | 12 to 28 |
| Alumina, $Al_2O_3$ | 6 to 10 |
| Iron oxide, FeO | 0.5 to 1 |
| Calcium oxide, CaO | 11 to 15 |
| Magnesium oxide, MgO | 2.5 to 6 |
| Sodium oxide, $Na_2O$ | 3 to 7 |
| Potassium oxide, $K_2O$ | 8 to 21 |

Acids

| | Per cent |
|---|---|
| Silicon dioxide, $SiO_2$ | 9 to 17 |
| Phosphorus pentoxide, $P_2O_5$ | 0.1 to 0.4 |
| Sulphur trioxide, $SO_3$ | 1.2 to 3.0 |
| Sulphur dioxide, $SO_2$ | 1.0 to 3.0 |
| Chlorine, Cl | 1.0 to 2.5 |
| Hydrogen sulphide, $H_2S$ | 0.2 to 0.5 |
| Cyanogen, CN | 0.2 to 1.0 |
| Sulphocyanate, CNS | 1.0 to 2.0 |
| Carbon, uncombined, C | 1.0 to 3.0 |

Besides these, we have occasionally found other components present, such as titania, $TiO_2$, zinc oxide, ZnO, and barium oxide, BaO.

The finely divided dehydrated dust has an apparent specific gravity of about 0.2, weighs about 12 pounds per cubic foot, and any quantity of it resembles an extremely porous body with the voids filled with gas. When separated from the warm gas, the powder behaves as if each particle were surrounded by a film of gas of much greater volume than the particle itself.

When the hot dirty gas is conducted into a wet washer of any type, a part of the finest fume passes through the water without being wetted, but a large portion deposits on the surfaces of the washer and the pipes conducting the gas into it and sets to a hard compact mass resembling cement. A partial analysis of one such deposit is as follows:

| | Per cent |
|---|---|
| Silica, $SiO_2$ | 2.50 |
| Phosphorus pentoxide, $P_2O_5$ | 0.18 |
| Sulphur trioxide, $SO_3$ | 0.75 |
| Carbon dioxide, $CO_2$ | 22.50 |
| Hydrogen sulphide, $H_2S$ | .10 |
| Water, $H_2O$, and undetermined | 16.50 |
| Manganese oxide, MnO | 29.60 |
| Ferrous oxide, FeO | 0.30 |
| Alumina, $Al_2O_3$ | 1.25 |
| Calcium oxide, CaO | 20.80 |
| Magnesium oxide, MgO | 3.04 |
| Barium oxide, BaO | .80 |

While this analysis shows that the hard cement-like portion of the dust consists largely of the carbonates and hydroxides of the bases present, various physical and chemical tests indicate that the silica and alumina are combined with calcium oxide, probably as the tricalcium silicates and aluminates, $3CaO \cdot SiO_2$ and $$3CaO \cdot Al_2O_3$$

which are the chief constituents of Portland cement, and that part of the manganese is present as the hydroxide.

The remainder of the silica in the dust is combined with the alkalies and other bases, and by treatment with a weak acid, it can be liberated as a gel which has some cementing properties, holding the particles of dust together up to a temperature of about 500° F.

We have found that if water in the vapor phase is added to the dirty gas at elevated temperatures, and the gas stream is then cooled to a temperature well below the decomposition range for the carbonates and hydrates but not below the dew point of the moisture-bearing gas, that is to say, 212° F., the dust particles absorb a little moisture and carbon dioxide from the gas and can be more easily separated from the gas, they then being in the form of a dry gray powder. If this powder is exposed to the air while it is still hot, the manganese compounds, which we believe consist of the oxide, MnO, the carbonate, $MnCO_3$, and the sulphide, MnS, are rapidly oxidized by the oxygen of the air, to the higher oxide, $Mn_3O_4$, and the hydrated oxide, MnOOH, this change being accompanied by an evolution of heat and a change in color of the dust from gray to reddish brown.

If now this dust is separated from the gas under these conditions, kept under cover, protected from rain and excessive moisture in any other form, permitted to oxidize to a certain stage in the air; and is then mixed thoroughly with a certain proportion of water, compressed into a suitable form, such as a briquette, allowed to cure, or season, for a time in a dry air or in warm flue gases containing carbon dioxide, then dried gradually to eliminate the excess water, it forms hard, compact masses that do not crumble at temperatures below 1500° F. and are otherwise suitable for charging into the blast furnace. These briquettes, however, must be stored under cover until charged, because they absorb water and are disintegrated by weathering, especially freezing, as any weak cement will do under similar conditions.

These are the conditions, based upon the properties of the materials, that must be met in the recovery of this dust from the gas and its utilization in the blast furnace. If all these conditions are not met in the separation of the dust from the gas, modifications in its subsequent treatment may be made as corrective measures, and we have developed the treatments to meet all the ordinary variations encountered in the operation of furnaces equipped for dry cleaning of the gas.

We now describe in detail the complete process of our invention, step by step, as follows.

As pointed out above, the first requirement for the easy separation of the dust and fume from the gas, is that a certain amount of moisture in the form of water vapor be introduced into the dirty gas. Since the dust has cementing properties, introduction of this water by the usual method of spraying cannot be used after the gas has cooled to a low temperature, without danger of completely blocking the passage of gas through the apparatus. We may, however, introduce this water in the form of superheated steam at any point sufficiently distant from the cleaning apparatus to permit thorough mixing.

Some of the water required is contained in the ore, but usually this is not sufficient, and we may introduce additional water by wetting the charges of ore, coke, and limestone, but this method has certain disadvantages which it is well to avoid.

As the gases are highly heated when they reach the top of the furnace and it is necessary to cool them to protect the bells and valves, we prefer to spray the water into the top of the furnace above the stock, because in this way the amount of water sprayed and the top temperature of the furnace, are constantly under quick control. As the gases are very hot, the water sprayed is almost instantly vaporized to steam at the same temperature as the gases without wetting the dust; and since the heat required to vaporize a given weight of water is constant and is all obtained from the gases, the drop in temperature of the latter is almost directly proportional to the quantity of water sprayed, and the quantity sprayed is controlled, through known means, by the top temperature of the gases which is measured by one of the usual forms of recording pyrometers. By this means, the temperature of the gases leaving the furnace top may be held practically constant at any point within the range of 750° F. to 1050° F., but may be raised or lowered within this range to suit conditions fixed by the location and type of cleaning equipment used.

The next step in the process of our invention is to cool the gases sufficiently to permit the sublimates in the gas to condense and the thoroughly dehydrated dust particles to absorb some moisture and carbon dioxide from the gas. For this purpose, we cool the dirty gases to as low a temperature as practicable without danger of the gases reaching the dew point in any part of the succeeding gas cleaning apparatus, for the condensation of moisture at any point is accompanied by a building up of a cement-like deposit at that point. The exact temperature, therefore, is fixed by the cleaning equipment itself, and with some types of cleaners, it must also be varied to suit different weather conditions. After such cooling, to clean the gas thoroughly and obtain the dust in the form desired for subsequent treatment, we prefer a tube type electrical precipitator, though other forms of dry gas cleaning equipment may be used.

For cooling the gas, we use a suitable type of heat exchanger, of which there are several of known design. The heat exchanger we prefer is a special design of the gas to liquid type, in which water is used as the cooling medium. In this type, the hot dirty gas from the dust catcher enters the heat exchanger through an opening and is distributed to pass slowly upward through narrow rectangular flues to exits at the top. Into chambers enclosing these passages. water is introduced through the inlet to a depth of several inches at their bottoms, the exact depth of which is indicated by a gage. The hot gases entering at the bottoms supply heat for boiling the water, the steam from which fills the chambers above, and passes out through the exit.

This type of heat exchanger or cooler assures that the temperature of the gases cannot drop below 212° F., and the total drop in temperature is controlled by the area of the surfaces and the rate of flow through the apparatus. Since we may keep the top temperatures of the furnace constant and within a known range, and the approximate volume of gas produced is known, the size of cooler required can be closely estimated in advance of erection of the equipment. Full control of the temperature of the gas leaving this apparatus is had through the quantity of water sprayed into the top of the furnace, since a top temperature range of 200° to 300° F. is practicable for operation of the furnace.

As pointed out previously herein, the most finely divided components of the dust have a tendency to adhere to smooth surfaces, so that in time this fine dust deposits on the cooling surfaces of the cleaner to a depth sufficient to interfere with the heat transfer of the apparatus. When this occurs, the dust must be cleaned from the surfaces. Chains have been used for this purpose, but we prefer scrapers of a suitable type, which are attached to rods for movement vertically. With these rods the scrapers can be pushed to the bottom of the flue forcing the dust into a receiving chamber, from which it is emptied as desired into a suitable container through a valve.

Generally, however, the clean gas is burned and it is desirable to have its temperature as high as possible. To meet these requirements, we may use a gas to gas heat exchanger, using the heat contained in the hot dirty gas to preheat the colder clean gas. There are many heat exchangers of known design that may be used for this purpose. In a heat exchanger of this type the hot dirty gas from the dust catcher enters the heat exchanger through a suitably designed inlet, passes through the various narrow rectangular flues, and exits through an outlet, which conducts the gas directly to the gas cleaning apparatus. The colder gas from the cleaner enters the heat exchanger through an inlet or inlets to pass through, countercurrent to the hot dirty gas, to flues leading to the combustion chambers. In this type of heat exchanger, dust collects upon the surfaces of the plates and must be removed at intervals, as described in the case of the gas to liquid type of heat exchanger.

From the heat exchanger, the dirty gas is conducted directly to the gas cleaning apparatus, where the dust is separated and collected by known means, this now being possible. From the hoppers of the gas cleaning apparatus, we convey the dust, preferably in a closed system, to a covered bin where it is exposed to the air for a period of time sufficient to start oxidation of the manganese compounds. Complete oxidation of the manganous compounds is hastened by increasing the temperature of the dust, and is indicated by the change in color of the dust from a light gray to a reddish or brownish gray. Complete oxidation of the manganese compounds, however, is not necessary to our process, and the subsequent treatments need not be delayed till this transformation in color has progressed to an end. In fact, we obtain slightly better results if the oxidation is progressing during the subsequent mixing operations.

The next step is to mix this dust with a suitable aggregate material as for concrete. Since the manganese and the iron content of the dust are both low, this aggregate should be one that will add to the value of the products as a raw material for the blast furnace. Also, because the dust forms a weak cement, the aggregate should be hard and rather strong, or strong and very porous. Coke dust meets the last of these requirements, but is lacking in strength. The coarser dust, collected in the dust catcher of an iron or manganese furnace, and dry granulated slag from the furnace, as well as crushed open-hearth or Bessemer converter slag, can be used, but these add little to the value of the material for blast furnace use.

To meet all the requirements, we have found that roll scale produced in the rolling of steel is most satisfactory, and we prefer to use it if it is obtainable. This material may be mixed with the dust in various proportions as follows: by weight, 1 part of scale to 4 parts of dust, and 1 part of scale to 2 parts of dust; and by volume 1 part of the scale to 6 parts or 10 parts of the dust. We have obtained a satisfactory briquette by mixing these materials in equal parts by weight. The scale can be added in any proportion, however, up to the maximum that will set satisfactorily.

Crushed hard ore, fine sintered material, or crushed limestone from ⅛ inch to ¼ inch in particle size may be used, but for economic reasons, mainly, we prefer to use a by-product or a waste product which has to be handled, whatever may be the plan of its disposal. The aggregate chosen is added to the dry dust, and the two materials are thoroughly mixed together preferably by a machine designed for such purposes, such as a concrete mixer or a pug mill.

The next additions depend upon the setting properties of the particular dust being recovered, which are determined by trial. If the dust has extremely weak bonding properties, we may add a small proportion, say 1 to 5 per cent by weight, of Portland cement, but we have seldom found it necessary to add cement. For a dust that sets quickly to form a hard briquette after being wetted with water and treated as described below, we add to the mixture a carefully regulated quantity of water just sufficient to permit the moist material to be balled in the hand, that is, to be formed into a ball by kneading and pressing between the palms of the hands. For example, with roll scale mixed with the dust in equal proportion by weight, we add the water in the proportion by volume of about 1 part of water to 6 parts of the dust mixture, or by weight in the proportion of 1 part of water to about 4 parts of the dust mixture. The exact quantity of water it is best to add depends upon many variables in the dust mixture, and we depend upon the balling test to indicate when sufficient has been added. This water is preferably sprayed upon the mixture during the mixing operations, which are continued until the material is uniformly moistened.

For a dust that is high in calcium compounds and that has been permitted to absorb too much moisture and then exposed too long to the air or to a gas containing carbon dioxide, we first acidify the water used to moisten the mixture with about 1 part in 1000 parts of hydrochloric acid, or preferably with about 5 parts in 100 parts of the waste pickle liquor obtained in the cleaning, or pickling, of steel sheets, rods, and bars with sulphuric acid. The action of these two acids differs markedly.

Hydrochloric acid liberates some carbon dioxide and a little of the silica as a gel, besides reacting with manganese to form manganous chloride, which with the silicic acid possesses some cementing properties. Care in the use of this acid must be observed to avoid using too much, as it is capable of causing the dust to lose its setting properties.

Pickle liquor contains some free acid, but is made up mainly of ferrous sulphate. This solution liberates carbon dioxide in the dust mixture and reacts with lime to form calcium sulphate and either the hydrate or the carbonate of iron, generally the latter, and thus increases the setting properties of the dust mixture.

To improve the setting properties of dust mixtures low in lime, that is, calcium compounds, we may add a small portion of the acidified water, and then complete the moistening with milk of lime, that is, with a solution of calcium hydroxide, which will be converted to the carbonate by the carbon dioxide generated by the acid.

For dust mixtures low in lime that have been over-exposed to the air or to gases containing carbon dioxide, we may use milk of lime either alone or diluted with water to moisten the mixture.

Any of these liquids are preferably sprayed upon the dry mixture as it is being stirred by a suitable form of mixing device. For this purpose a tumbling type of mixer is not suitable as the moist material tends to ball, and water or solutions sufficient to cause it to flow must not be added. Therefore, we employ for this purpose a mixing device of the kneading or masticating type, which will quickly and thoroughly mix the moist material first wetted by the sprays with the dry material to distribute the moisture uniformly throughout the material treated. Suitable machines of known design are available for this purpose, and we have successfully mixed the moistened material by hand with hoes, much in the manner that mortar is mixed. However, for production on a large scale hand mixing is not practicable.

As soon as the moistened mixture of dust and aggregate has been thoroughly mixed, we compress it to form bodies of the size and shape desired. Neither the size nor the shape of these bodies is critical to the process, but for blast furnace use, we prefer bodies spherical or cylindrical or nearly so in form and 2½ to 4 inches in diameter. Briquettes of this form and size are convenient for drying and curing and are subject to less breakage in handling. The amount of compression, however, is important. On adding the water and mixing, the volume of the mixture generally shrinks to about half the volume of the dry dust mixture, and we compress the moistened mixture to about half its volume in forming the briquettes. The guide we use to determine the proper compression is the rising of water to the surface. For example, the properly moistened and mixed dust will appear almost dry but not dusty, but when this mixture is properly compressed the surface of the briquette will be visibly wet. In other words, the moist material must be compressed until it contains no voids and is practically free of occluded gases which are expelled with the water. When this condition is reached, the excess water and gas is forced toward the surface, and the compressed briquette will have a specific gravity of 3 or more.

The compressing operation may be performed by any known means that will meet the requirement of a sufficient reduction in volume, and several machines of known design are available for the purpose. We have obtained entirely satisfactory results by ramming, tamping, and extrusion methods.

Prior art methods of forming coherent bodies from flue dust have contemplated the use of water mixed with the dust and followed by compression. However, due to failure to use water in proper amount and to insufficient mixing or kneading, the compression necessitated the use of such high pressures as to be impractical. We have found that by extending the kneading and limiting the water or other liquid used to a degree just permitting the material to be balled in the hand, the compressing pressures necessary to produce bodies that can be handled are greatly lessened. If the moistened and kneaded dust will not ball even unlimited compression will fail to produce results, and the use of too much liquid necessitates the excessive pressures required by the prior art.

To initially determine the amount of liquid and the duration of kneading required in the case of the dust or the mixture of dust and aggregate, the liquid is added in small amounts with the kneading prolonged as required to assure that failure of the material to ball is due to insufficient liquid rather than insufficient kneading. This permits determination of the minimum amount of liquid which will permit balling of the material after sufficiently prolonged kneading. Although apparently dry, a material that is properly conditioned in this manner will become visibly moist on its surface when subjected to relatively slight pressure and will then cohere.

The last step in our process consists merely of drying and aging, or curing, the compressed material in air protected from the weather. If it is desired to hasten the drying process, we prefer to use warm flue gases, these being products of combustion containing carbon dioxide as well as some oxygen.

When using waste gases for the drying, we pass the compressed briquettes on trays in one end of a long covered lehr and introduce the gas at the opposite end to flow countercurrent to the direction of the movement of the briquettes. After one or more hours' drying, the briquettes may be permitted to roll slowly down an inclined floor to complete the drying operation. After drying, the compressed material may be cured for an indefinite period of one or more days or weeks, preferably while kept under cover. Though long curing may not be required, it is to be noted that the product of our invention becomes harder with age and is otherwise benefited by long storage, and in this respect it differs from some briquettes which tend to disintegrate with age. After the curing and drying, we transfer the bricks to the blast furnace bins and charge them to the furnace with as little exposure to weathering as possible.

Although we have described in detail the principles and operations of our process, various modifications may be made in carrying out the necessary operations without exceeding the scope of our invention as defined by the following claims.

An illustration of the invention is provided by the accompanying drawing. Since the drawing is clearly legended, its detailed description is unnecessary.

This application is a continuation of applicants' copending application Serial No. 249,156, filed January 3, 1939.

We claim:

1. A process for separating the finely divided solids from gases produced by blast furnaces making iron-manganese alloys, which process includes introducing water into the furnace top gases to cool them to a constant range of temperature above the dehydration temperature of the solids, conducting the dust-bearing gases through a dust catcher to separate the coarser dust, cooling the gases to a temperature above the dew point of the gas where the solids begin to absorb water and carbon dioxide from the gas, then separating the dust by known devices.

2. A process for separating the finely divided solids from gases produced by blast furnaces making iron-manganese alloys, which process includes introducing superheated steam into the gases to cool them to a temperature above the dehydration temperature range of the hydroscopic components of the dust but below the decomposition temperature of the carbonates of these components, separating the coarser dust particles, then cooling the gases without further introduction of water to a lower temperature above the dew point of the gas, and separating the fine dust by means of suitable apparatus all parts of which are maintained by the hot gas at a temperature above its dew point.

3. A process for reclaiming the fine dust produced by blast furnaces making iron-manganese alloys, which process includes separating the dust from the gas in a dry condition, mixing the dust with an aggregate material suitable as a raw material for blast furnace consumption, moistening this mixture with a dilute solution of an acid insufficient to form a mud or plaster, and compressing the moist mixture into the form of a solid.

4. A process for reclaiming the fine dust produced by blast furnaces making iron-manganese alloys, which process includes separating the dust from the gas in a dry condition, mixing the dust with an aggregate material suitable as a raw material for blast furnace consumption, moistening this mixture with a solution containing iron salts insufficient to form a mud or plaster, and compressing the moist mixture into the form of a solid.

5. A process for reclaiming for use in iron and steel making furnaces the fine dust produced by blast furnaces making iron-manganese alloys, which process includes cooling the gases as they leave the furnace with water or steam to a temperature below the decomposition of the carbonates of iron, manganese, and calcium, separating the coarser dust, again cooling the gases without the introduction of water to a temperature above the dew point of the gas but below the dehydration range of the hydroscopic dust particles, and separating the dust in a dry condition.

6. A process for reclaiming for use in iron and steel making furnaces the fine dust produced by blast furnaces making iron-manganese alloys, which process includes cooling the gases as they leave the furnace with water or steam to a temperature below the decomposition of the carbonates of iron, manganese, and calcium, separating the coarser dust, again cooling the gases without the introduction of water to a temperature above the dew point of the gas but below the dehydration range of the hydroscopic dust particles, and separating the dust in a dry condition, the separated dust being subsequently moistened to develop its cement-like characteristic and permit its formation into solid form adapted for handling.

7. A process for recovering the fine dust in gas from a blast furnace handling manganese ore, including adding water in the vapor phase to said gas while it is hot from said furnace, cooling said gas to a temperature sufficiently below the decomposition temperature range of its carbonates and hydrates but above its dew point temperature to thereby convert said fine dust to a more easily handled powder, separating said powder from said gas, exposing said powder to oxygen under conditions causing it to at least start to oxidize, mixing said powder with just enough water and by sufficient mechanical kneading or masticating to permit balling of the resulting mixture, compressing said mixture into units with sufficient pressure to cause visible extrusion of moisture therefrom and drying said units.

8. A process for recovering the fine dust in gas from a blast furnace handling manganese ore, including adding water in the vapor phase to said gas while it is hot from said furnace, cooling said gas to a temperature sufficiently below the decomposition temperature range of its carbonates and hydrates but above its dew point temperature to thereby convert said fine dust to a more easily handled powder, separating said powder from said gas, exposing said powder to oxygen under conditions causing it to at least start to oxidize, mixing said powder with just enough water and by sufficient mechanical kneading or masticating to permit balling of the resulting mixture, compressing said mixture into units with sufficient pressure to cause visible extrusion of moisture therefrom and drying said units, said process including acidifying said water mixed with said powder, in the event said powder is high in calcium compounds and has been permitted to absorb too much moisture and then exposed too long to air or to gas containing carbon dioxide.

9. A process for recovering the fine dust in gas from a blast furnace handling manganese ore, including adding water in the vapor phase to said gas while it is hot from said furnace, cooling said gas to a temperature sufficiently below the decomposition temperature range of its carbonates and hydrates but above its dew point temperature to thereby convert said fine dust to a more easily handled powder, separating said powder from said gas, exposing said powder to oxygen under conditions causing it to at least start to oxidize, mixing said powder with just enough water and by sufficient mechanical kneading or masticating to permit balling of the resulting mixture, compressing said mixture into units with sufficient pressure to cause visible extrusion of moisture therefrom and drying said units, said process including acidifying said water mixed with said powder, in the event said powder is high in calcium compounds and has been permitted to absorb too much moisture and then exposed too long to air or to gas containing carbon dioxide, said process including substituting for said water mixed with said powder, acidified water followed by milk of lime, in the event said powder is low in lime.

10. A process for recovering the fine dust in gas from a blast furnace handling manganese ore, including adding water in the vapor phase to said gas while it is hot from said furnace, cooling said gas to a temperature sufficiently below the decomposition temperature range of its carbonates and hydrates but above its dew point temperature to thereby convert said fine dust to a more easily handled powder, separating said powder from said gas, exposing said powder to oxygen under conditions causing it to at least start to oxidize, mixing said powder with just enough water and by sufficient mechanical kneading or masticating to permit balling of the resulting mixture, compressing said mixture into units with sufficient pressure to cause visible extrusion of moisture therefrom and drying said units, said process including acidifying said water mixed with said powder, in the event said powder is high in calcium compounds and has been permitted to absorb too much moisture and then exposed too long to air or to gas containing carbon dioxide, said process including substituting for said water mixed with said powder, milk of lime alone or diluted with water as required, in the event said powder is low in lime and has been overexposed to air or to gases containing carbon dioxide.

11. A process for reclaiming the fine dust produced by blast furnaces making iron-manganese alloys, said process including separating the dust from the blast furnace gas in a dry condition, mixing the dust with just enough water and by sufficient mechanical kneading or mastication to permit balling of the resulting mixture, compressing said mixture with sufficient pressure to cause expulsion of occluded gases therefrom and visible extrusion of moisture, whereby said mixture becomes coherent, forming said mixture into units, and drying said units.

12. The process of reclaiming the fine dust produced by blast furnaces making iron-manganese alloys, which comprises separating the dust from the gas in dry condition, moistening the dust with sufficient water to cause the dust to form a coherent ball when pressed in the hand, but insufficient to produce a sensible wetting of the dust, uniformly mixing the powder and water and wetting at least substantially all particles of the powder by sufficient mechanical kneading or masticating until at least substantially all occluded gases in the dust are expelled, as indicated by a visible appearance of moisture upon the surface of the mixture being worked, compressing the resulting mixture, and drying and hardening the resulting material to render it into a condition suitable for charging back into the furnace.

13. A process for reclaiming the fine dust produced by blast furnaces making iron-manganese alloys, which process includes separating the dust from the gas in a dry condition, mixing the dust with other iron or manganese oxide bearing material, moistening this mixture with water insufficient to form a mud or plaster but sufficient to cause the mixture to form a coherent ball when pressed in the hand, mixing and kneading these components together under a low pressure until uniformly mixed and moisture appears on the surface of the dust, and compressing this mixture into the form of a solid.

14. In a process for recovering finely divided solids from gases produced by blast furnaces making iron-manganese alloys, the improvements which consist in introducing water in the vapor phase into the hot gases from the furnace, and cooling the resulting mixture to below the decomposition range of carbonates and hydrates in the said solids but above the dew point of the said mixture.

15. In a process for recovering finely divided solids from gases produced by blast furnaces making iron-manganese alloys, the steps which comprise mixing dry water vapor with the hot gases from the furnace, cooling the resulting mixture to below the decomposition range of carbonates and hydrates in the solids, but above the dew point of the said mixture, separating the solids in dry condition from the gases, briquetting the solids by utilizing bonding properties inherent to the solids, and recharging the briquetted solids into the blast furnace.

16. In a process for recovering finely divided solids from gases produced by blast furnaces making iron-manganese alloys, the improvement which consists in subjecting a dry, water-bearing stream of the said gases and solids to cooling until the said stream is cooled to below the decomposition range of carbonates and hydrates contained in the said stream, but above the dew point of the said stream.

17. In a process for recovering dust from gases produced by blast furnaces handling manganese ores, the improvements which consist in maintaining the gases containing substantial amounts of water vapor at temperatures above their dew point but below the dehydration range of hygroscopic dust particles contained in the gas, and separating the dust in dry condition.

18. A process for recovering the finely divided solids from gases produced by blast furnaces making iron-manganese alloys, which comprises cooling the gases with water to a temperature range of from approximately 600° F. to approximately 750° F. as the gases issue from the furnace, separating coarser dust, cooling the gases to a temperature above the dew point thereof, and separating the finely divided dust from the gases in dry condition.

19. A process for recovering finely divided dust produced by blast furnaces making iron-manganese alloys, which comprises separating the dust in dry condition from the furnace gas which carries it, mixing the dust with an aggregate material suitable as a raw material for blast furnace consumption, moistening this mixture with water but not substantially more than required to cause the mixture to ball when pressed in the hand, and working the said mixture under a sufficient pressure to cause expulsion of occluded gases therefrom and visible extrusion of moisture, whereby the said mixture becomes coherent, forming the mixture into units and drying the units.

20. A process for recovering finely divided dust produced by blast furnaces making iron-manganese alloys, which comprises separating the dust from the furnace gas which carries it, mixing the dust with an aggregate material suitable as a raw material for blast furnace consumption, moistening this mixture with water but not substantially more than required to cause the mixture to ball when pressed in the hand, kneading the mixture until an intimate contact between all components thereof and an appearance of moisture occurs on its surface are obtained, and pressing the mixture into solid form.

21. A process for recovering finely divided dust produced by blast furnaces making iron-manganese alloys, which comprises separating the dust in dry condition from the furnace gases which carries it, moistening the dust with water, but not with substantially more than required to cause the dust to ball when pressed in the hand, mechanically working the dust until moisture appears on the surface thereof, pressing the dust into solid form, and allowing the pressed dust to harden.

22. A process for recovering finely divided dust produced by blast furnaces making iron-manganese alloys, which comprises separating the dust in dry condition from the furnace gases which carries it, moistening the dust with water, but not with substantially more than required to cause the dust to ball when pressed in the hand, kneading the dust until moisture appears on the surface thereof, pressing the dust into solid form, allowing the pressed dust to harden, and charging the resulting hardened material into the blast furnace.

23. A process for recovering finely divided dust produced by blast furnaces making iron-manganese alloys, which comprises separating the dust from the furnace gas which carries it, mixing the dust with an aggregate material suitable as a raw material for blast furnace consumption, moistening the mixture with water but not substantially more than the amount required to cause the mixture to form into a cohesive ball when pressed in the hand, kneading the mixture until an intimate contact between all components thereof is obtained and an appearance of moisture occurs on the surface thereof, pressing the mixture into solid form, and allowing the resulting mixture to harden.

24. A process for recovering finely divided dust produced by blast furnaces making iron-manganese alloys, which comprises separating the dust from the furnace gas which carries it, mixing the dust with an aggregate material suitable as a raw material for blast furnace consumption, moistening the mixture with water but not substantially more than the amount required to cause the mixture to form into a cohesive ball when pressed in the hand, kneading the mixture until an intimate contact is obtained between all components of the mixture and an appearance of moisture occurs on the surface thereof, pressing the mixture into solid form, allowing the pressed mixture to harden, and charging the resulting hardened material into the furnace.

25. A process for recovering finely divided dust produced by blast furnaces making ferrous metals, which comprises separating the dust from the furnace gas which carries it, mixing the dust with an aggregate material suitable as a raw material for blast furnace consumption, moistening this mixture with water, but not substantially more than an amount sufficient to enable the mixture to form a coherent ball when pressed in the hand, but insufficient to produce a sensible wetting of the dust, uniformly mixing the resulting mixture by sufficient mechanical kneading or masticating until substantially all occluded gas is expelled therefrom as evidenced by an appearance of visible moisture on the surface of the mixture, pressing the mixture into solid form, hardening the mixture and charging it back into the furnace.

CHARLES B. FRANCIS.
LAWRENCE E. RIDDLE.